(12) United States Patent
Owada

(10) Patent No.: US 8,517,280 B2
(45) Date of Patent: Aug. 27, 2013

(54) IC CARD

(75) Inventor: Fukuo Owada, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 396 days.

(21) Appl. No.: 12/884,550

(22) Filed: Sep. 17, 2010

(65) Prior Publication Data

US 2011/0084146 A1   Apr. 14, 2011

(30) Foreign Application Priority Data

Oct. 14, 2009   (JP) ................................. 2009-236803

(51) Int. Cl.
*G06K 19/06*   (2006.01)

(52) U.S. Cl.
USPC .............................. 235/494; 235/492; 235/451

(58) Field of Classification Search
USPC .......................................... 235/492, 494, 451
See application file for complete search history.

(56) References Cited

U.S. PATENT DOCUMENTS

| | | | | |
|---|---|---|---|---|
| 6,950,074 B2 * | 9/2005 | Arisawa et al. | | 343/748 |
| 2006/0198629 A1 * | 9/2006 | Tomita et al. | | 396/429 |
| 2007/0095913 A1 * | 5/2007 | Takahashi et al. | | 235/451 |
| 2008/0129628 A1 * | 6/2008 | Rosengren et al. | | 343/785 |

FOREIGN PATENT DOCUMENTS

| | | | | |
|---|---|---|---|---|
| JP | 10193851 A | * | 7/1998 | |
| JP | 2001-313515 A | | 11/2001 | |
| JP | 2004206194 A | * | 7/2004 | |
| JP | 2004-348636 A | | 12/2004 | |
| JP | 2007-281818 A | | 10/2007 | |

* cited by examiner

*Primary Examiner* — Christle Marshall
(74) *Attorney, Agent, or Firm* — Mattingly & Malur, PC

(57) ABSTRACT

A contactless IC card which ensures the reliability of an IC chip mounted therein. Even if the distance between the contactless IC card and a reader/writer is too short, the card prevents an excessive voltage from being applied to the IC chip so that breakdown or reliability deterioration of the circuitry of the IC chip does not occur. The body of the contactless IC card has two interconnection substrates stacked between two external sheets. A first antenna coil formed on one interconnection substrate and a second antenna coil formed on the other interconnection substrate are opposite in winding direction. The number of turns of the second antenna coil is larger than that of the first antenna coil. Therefore, when the IC card comes close to the reader/writer, the voltage between two terminals of the IC chip is always smaller than the voltage induced in the second antenna coil.

8 Claims, 5 Drawing Sheets

15: FIRST ANTENNA COIL

16: SECOND ANTENNA COIL

IC CARD

CROSS-REFERENCE TO RELATED APPLICATIONS

The disclosure of Japanese Patent Application No. 2009-236803 filed on Oct. 14, 2009 including the specification, drawings and abstract is incorporated herein by reference in its entirety.

BACKGROUND OF THE INVENTION

The present invention relates to IC cards and more particularly to technology for contactless IC cards which transmit and receive signals and supply electric power by electromagnetic induction.

In recent years, the use of contactless IC cards has been rapidly spreading in a wide range of fields including electronic transportation tickets, credit cards and ID cards because they can be conveniently used to read and write data without the need for insertion into an exclusive machine for IC cards.

A contactless IC card has an antenna coil and an IC chip embedded in a card body and employs electromagnetic induction technology to transmit and receive signals and supply electric power using electromagnetic waves from an external reader/writer.

The circuitry of the IC chip embedded in the card body includes a modem for modulating and demodulating a signal from a reader/writer, a control circuit for performing processing according to the signal, a power supply circuit for obtaining operating power, and a memory circuit for storing data.

JP-A No. 2007-281818 discloses a contactless IC card which securely and efficiently obtains required electric power depending on the distance from a reader/writer and exchanges required data with the reader/writer.

In this contactless IC card, a small antenna coil is located almost in the center of the card body and a large antenna coil, which has an antenna length larger than the small antenna coil, is located outside it. The two antenna coils are placed on a plane and an IC chip, electrically coupled to the two antenna coils, is located between them. The two antenna coils are disposed so that their winding directions are opposite to each other, which means that the phases of currents flowing in the two antenna coils are opposite and interference does not occur between the coils.

This contactless IC card makes a comparison as to whether the composite voltage of first received voltage from the small antenna coil and second received voltage from the large antenna coil is larger or smaller than a reference supply voltage. When the distance between the card and reader/writer becomes shorter than a prescribed distance, the large antenna coil is turned off and only the small antenna coil is activated, thereby preventing breakdown of the IC chip. On the other hand, when the distance from the reader/writer becomes longer than the prescribed distance, the large antenna coil is again turned on to obtain a high level of composite voltage so that power supply and data reception from the reader/writer are stably performed.

In the contactless IC card described in JP-A No. 2004-348636, a pair of electromagnetic induction coils which function as magnetic antennas are provided on a synthetic resin card base. These electromagnetic induction coils are placed on a plane and they are opposite in winding direction and equal in the number of turns.

In this case, when the distance between the contactless IC card and the reader/writer becomes shorter than the prescribed distance, an electromotive force twice larger than that generated by a single electromagnetic induction coil is obtained by interaction of the electromagnetic induction coils. Therefore, larger electric power is supplied to the IC chip of the contactless IC card, so the CPU can process complicated and high levels of calculations. Even if a disturbance magnetic flux is applied to the reader/writer in one direction, the disturbance magnetic flux can be cancelled so that communications between the contactless IC card and the reader/writer are stable.

The contactless IC card reader/writer described in JP-A No. 2001-313515 has an antenna section which includes two circular loop antennas with different radii. The two loop antennas are located so that their centers coincide, and ends of them are coupled so that currents flow through them in opposite directions. The distance of each of the two loop antennas from the center is fixed so that the intensity of a composite magnetic field which combines magnetic fields generated by the loop antennas does not increase at a short distance. This ensures that the intensity of the magnetic field generated by the antenna section is independent of the communication distance and maintained at a constant level so that it can stably communicate with an IC card at a short distance and can also communicate with an IC card at a remote distance.

SUMMARY OF THE INVENTION

As the intensity of a magnetic field received by an antenna coil of a contactless IC card varies according to the distance from a reader/writer, the electric power supplied to the circuitry of the IC chip varies accordingly.

Therefore, if the distance between the contactless IC card and the reader/writer is too short and the voltage induced in the antenna coil suddenly increases, an excessive voltage could be momentarily applied to the IC chip, causing breakdown of the circuit or deterioration in reliability.

As solutions to this problem, various countermeasures have been taken: for example, a regulator circuit is provided in the IC chip to supply a constant voltage, or a thicker gate oxide film is used in a circuit element (MOS transistor) to increase the withstand voltage. However, these countermeasures make the IC chip manufacturing process complicated, leading to an increase in the cost of a contactless IC card.

Another approach may be to limit the usage of a contactless IC card and take a measure to keep the distance from the reader/writer constant. However, this approach lacks certainty and may make the contactless IC card less user-friendly.

An object of the present invention is to ensure the reliability of an IC chip mounted in a contactless IC card. Particularly, the invention is intended to provide a technique which ensures that an excessive voltage is not applied to the IC chip in the contactless IC card even if the distance between the contactless IC card and the reader/writer is too short.

The above and further objects and novel features of the invention will more fully appear from the following detailed description in this specification and the accompanying drawings.

A typical aspect of the invention which will be disclosed herein is briefly outlined below.

In a preferred embodiment of the present invention, a contactless IC card which transmits and receives signals and supplies electric power by electromagnetic induction includes a first antenna coil with one end electrically coupled to a first terminal of an IC chip, the coil having a first number of turns and a first winding direction, and a second antenna coil with one end electrically coupled to a second terminal of the IC chip, the coil having a second number of turns, different from the first number of turns, and a winding direction opposite to the first winding direction. Here, one of the first antenna coil and the second antenna coil lies over the other.

The advantageous effect of the preferred embodiment of the invention is briefly described below.

The preferred embodiment ensures the reliability of the IC chip mounted in the contactless IC card.

DETAILED DESCRIPTION OF THE PREFERRED EMBODIMENTS

Figure 1:
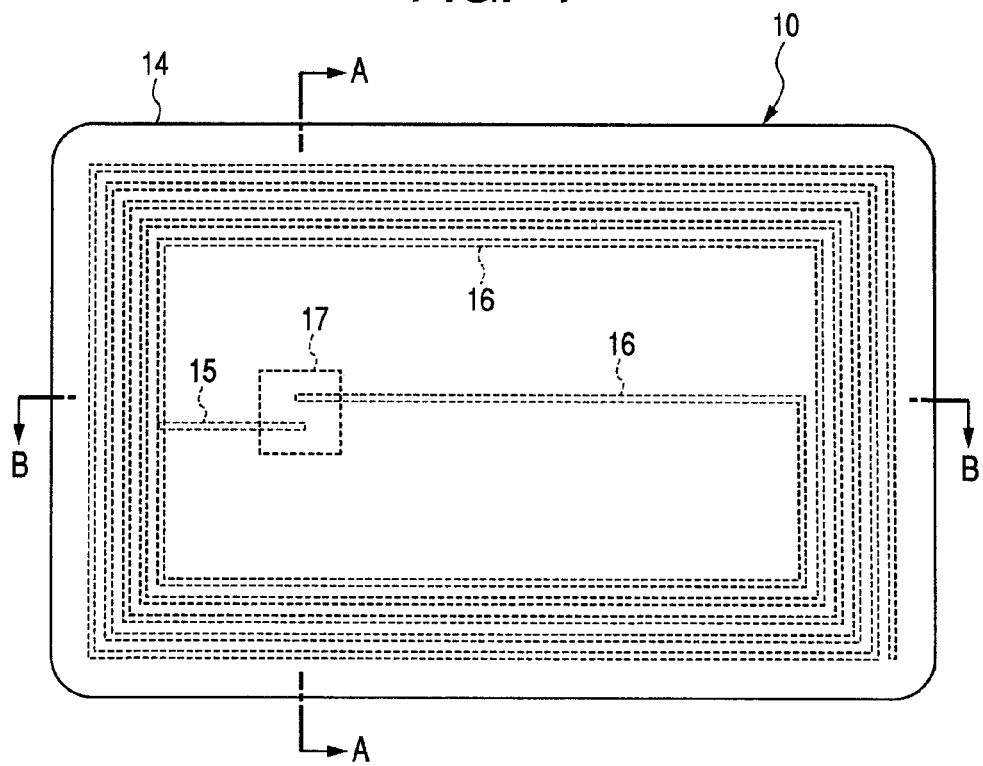
FIG. 1 is a plan view of a contactless IC card according to an embodiment of the invention.

Next, the preferred embodiments of the present invention will be described in detail referring to the accompanying drawings. Basically in all the drawings that illustrate the preferred embodiments, elements with like functions are designated by like reference numerals and repeated descriptions of such elements are omitted. In connection with the preferred embodiments described below, the same or similar descriptions will not be repeated except when needed. In the drawings, hatching may be used even in a plan view for easy understanding.

First Embodiment

Figure 2:
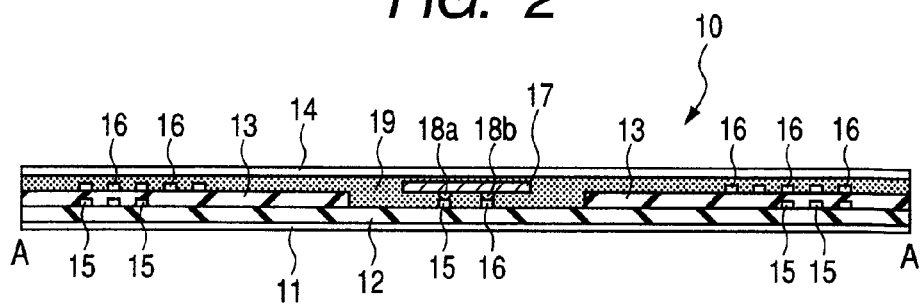
FIG. 2 is a sectional view taken along the line A-A of FIG. 1.
Figure 3:
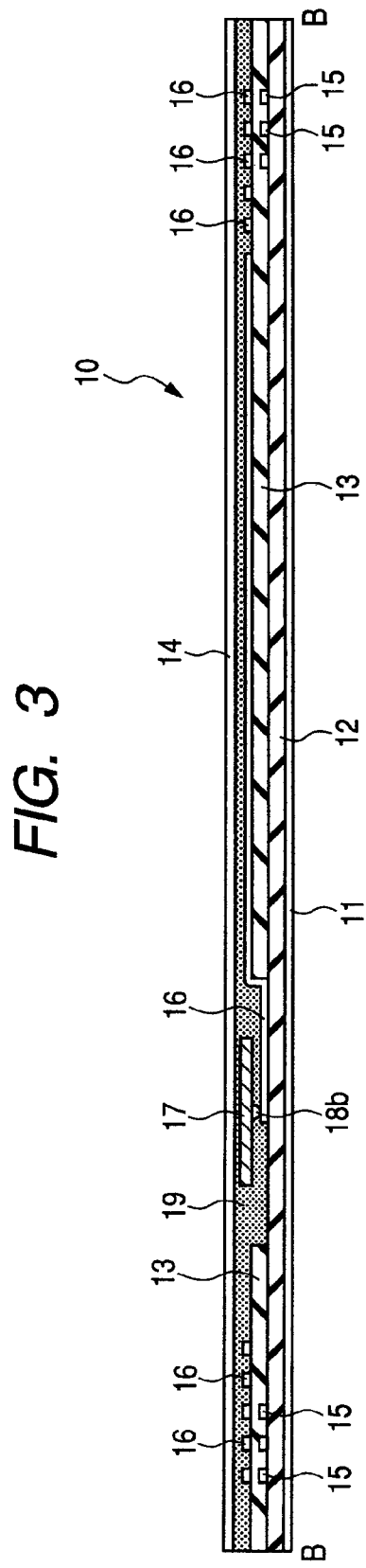
FIG. 3 is a sectional view taken along the line B-B of FIG. 1.

FIG. 1 is a plan view of a contactless IC card according to the first embodiment, FIG. 2 is a sectional view taken along the line A-A of FIG. 1, and FIG. 3 is a sectional view taken along the line B-B of FIG. 1.

A contactless IC card 10 according to this embodiment conforms to ID-1 (ISO/IEC 7810) in terms of dimensions and specifically its long side, short side and thickness are 85.6 mm, 54 mm and 0.76 mm respectively.

The body of the contactless IC card 10 is a laminate which has two interconnection substrates 12 and 13 between two external sheets 11 and 14. The external sheets 11 and 14 are made of synthetic resin such as polyester, polyethylene terephthalate or polyimide and the interconnection substrates 12 and 13 are made of synthetic resin such as polyester, polyethylene terephthalate, polyimide, polyvinyl chloride, acrylic or polycarbonate.

Though not shown, a given pattern, characters and numbers are printed on the surfaces of the external sheets 11 and 14 by offset printing or screen printing. In some cases, magnetic stripes are transferred to the external sheet 11 as the back of the card as necessary.

A first antenna coil 15 is formed on the surface of the lower one of the two interconnection substrates 12 and 13 (first interconnection substrate 12). On the other hand, a second antenna coil 16 is formed on the surface of the upper interconnection substrate (second interconnection substrate) 13. As will be described later, the first antenna coil 15 and second antenna coil 16 are spiral in a plan view.

The first antenna coil 15 is formed by a screen printing or dispensing process in which conductive paste such as silver (Ag) paste is supplied to the interconnection substrate 12 and heated to a given temperature. Similarly the second antenna coil 16 is formed on the interconnection substrate 13 by the same process as above. Alternatively these antenna coils (15, 16) may be formed by a process other than the above-mentioned, for example, by etching aluminum (Al) foil or copper (Cu) foil attached to the surface of each interconnection substrate (12, 13) or by a plating process.

An IC chip 17 is mounted over the interconnection substrate 12 where the first antenna coil 15 lies. Though not shown, the IC chip 17 incorporates a demodulating circuit for demodulating a signal from the reader/writer to get data, a control circuit for processing the data, a modulating circuit for modulating data to be sent, and a power supply circuit for obtaining operating power. In addition to the IC chip 17, passive components such as a capacitor may be mounted on the surface of the interconnection substrate 12.

A projecting electrode 18a electrically coupled to one terminal of the above circuitry and a projecting electrode 18b electrically coupled to the other terminal are formed on the main surface of the IC chip 17 mounted over the interconnection substrate 12. These projecting electrodes 18a and 18b are made, for example, as gold (Au) bumps. The IC chip 17 is a flip-chip mounted on the interconnection substrate 12 with its main surface bearing these projecting electrodes 18a and 18b down and electrically coupled to the first antenna coil 15 and second antenna coil 16 through the projecting electrodes 18a and 18b.

More specifically, one end of the first antenna coil 15 formed on the surface of the interconnection substrate 12 extends to under the IC chip 17 and is electrically coupled to the projecting electrode 18a of the IC chip 17. One end of the second antenna coil 16 formed on the surface of the interconnection substrate 13 extends to under the IC chip 17 and is electrically coupled to the projecting electrode 18b of the IC chip 17. Coupling between the projecting electrode 18a and the first antenna coil 15 and coupling between the projecting electrode 18b and the second antenna coil 16 are made using anisotropic conductive film (ACF) prepared by dispersion of conductive particles into thermosetting resin or solder.

The IC chip 17, mounted over the interconnection substrate 12, is covered by sealing resin 19 to protect it from moisture or dirt. The sealing resin 19 is thermosetting resin such as epoxy, silicone or polyimide and filled in the space between the interconnection substrates 12 and 13 and the external sheet 14.

As shown in FIG. 1, when the contactless IC card 10 is seen from above, the IC chip 17 is located inside the first antenna coil 15 and second antenna coil 16 and off the center of the card body. This embodiment exemplifies that the IC chip 17 is in a position near one end of the long side of the card body. In other words, the IC chip 17 is nearer to one short side of the card body than the center of the card body. The IC chip 17 may be in a position near one short side of the card body and near one long side of the card body.

As explained above, the contactless IC card 10 is a 0.76 mm-thick synthetic resin laminate, so when the user is carrying it, its center part in the long side direction will be easily deformed by an external stress applied to it. Therefore, if the IC chip 17 is mounted around the center of the card body, it may be damaged. In this embodiment, since the IC chip 17 is located near one end of the long side direction as described above, damage to the IC chip 17 will be prevented even if the card body is deformed.

Figure 4A:
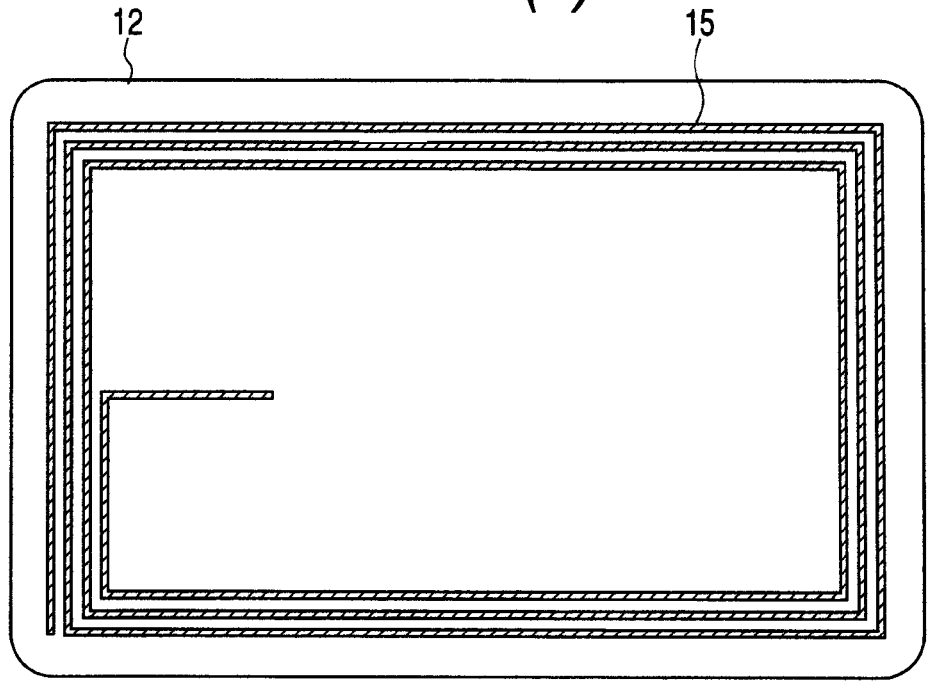
FIG. 4(a) is a plan view of a first antenna coil formed on the surface of a lower interconnection substrate and FIG. 4(b) is a plan view of a second antenna coil formed on the surface of an upper interconnection substrate.
Figure 4B:
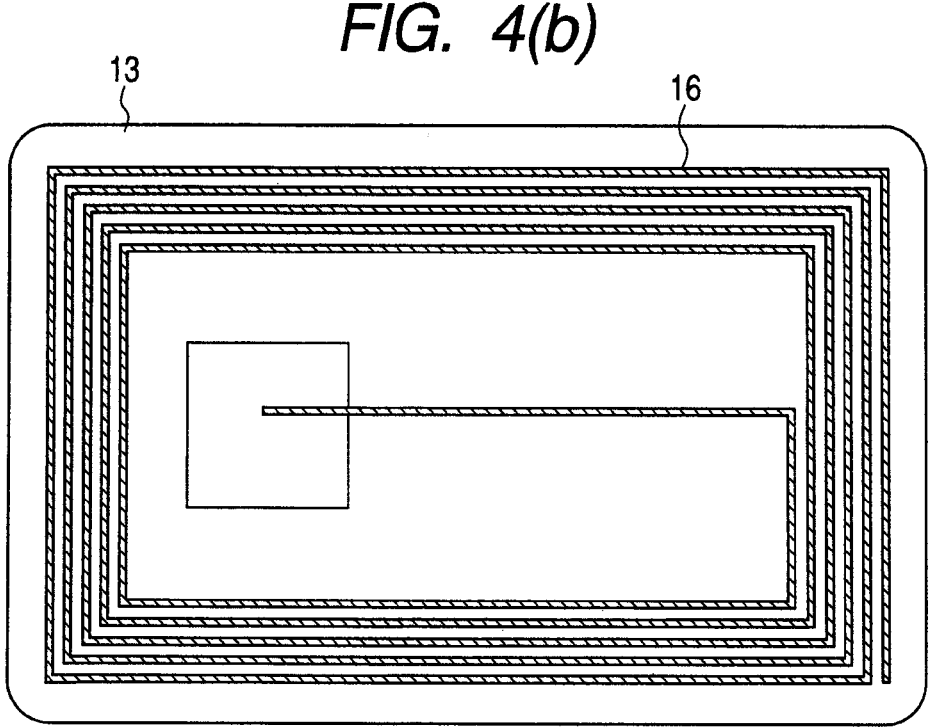
Figure 5:
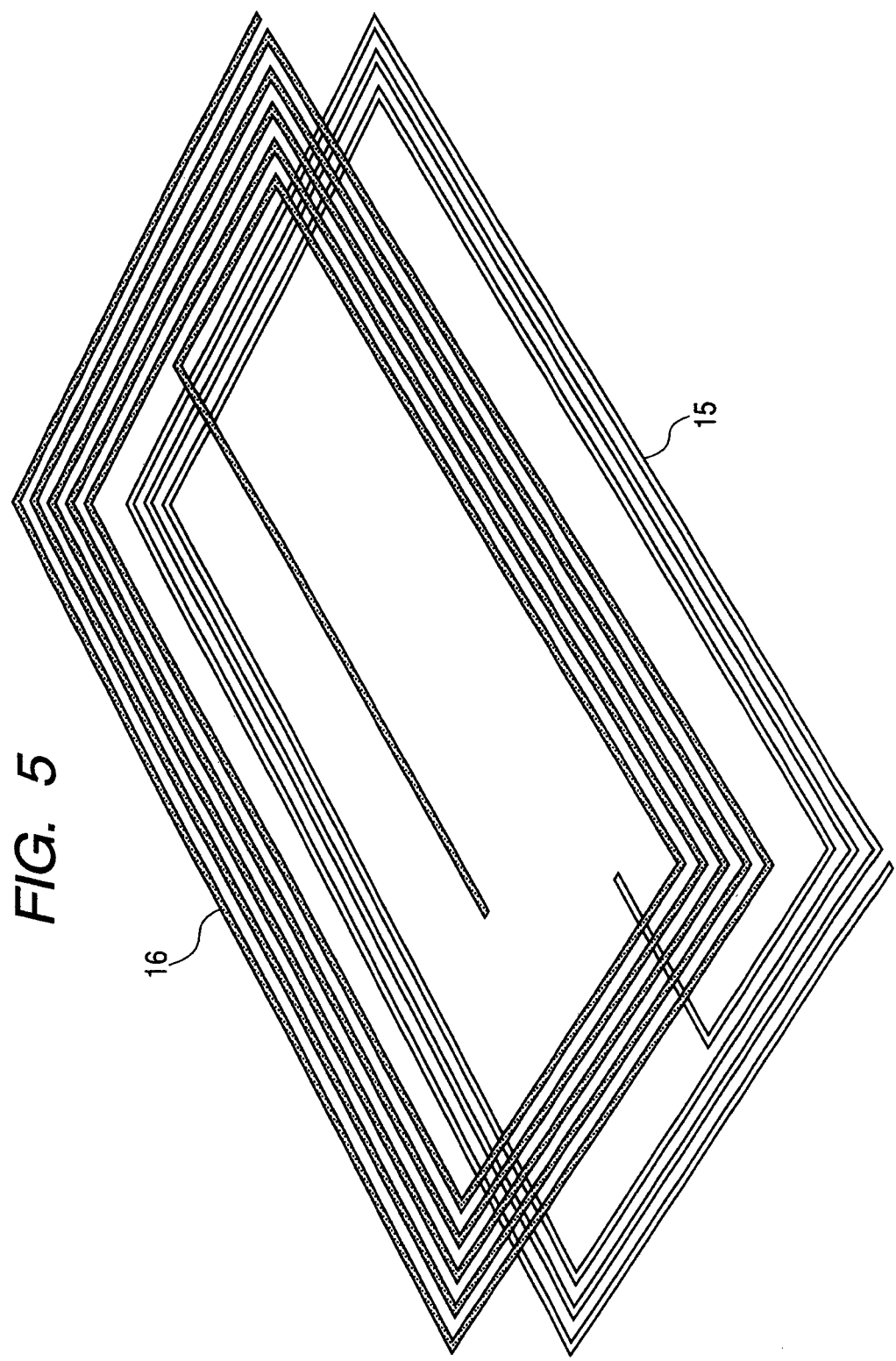
FIG. 5 is a perspective view schematically showing the first antenna coil and the second antenna coil stacked one upon the other.

FIG. 4(a) is a plan view of the first antenna coil 15 formed on the surface of the lower interconnection substrate 12, FIG. 4(b) is a plan view of the second antenna coil 16 formed on the surface of the upper interconnection substrate 13, and FIG. 5 is a perspective view schematically showing the first antenna coil 15 and the second antenna coil 16 stacked one upon the other.

As shown in FIGS. 4(a) and 4(b) and FIG. 5, the first antenna coil 15 is formed along the periphery of the surface of the interconnection substrate 12 and the second antenna coil is formed along the periphery of the surface of the interconnection substrate 13.

The first antenna coil 15 and second antenna coil 16 are wound in opposite directions. If the first antenna coil 15 is wound clockwise, the second antenna coil 16 is wound counterclockwise. The number of turns of the first antenna coil is smaller than that of the second antenna coil 16. Conversely, it is also allowed that the first antenna coil 15 is wound counterclockwise and the second antenna coil 16 is wound clockwise. Also the number of turns of the first antenna coil 15 may be larger than that of the second antenna coil 16.

The first antenna coil 15 and second antenna coil 16 are so located that their centers virtually coincide with each other when viewed from the direction in which the two interconnection substrates 12 and 13 overlap, namely a direction perpendicular to the surface of the contactless IC card 10.

Furthermore, the first antenna coil 15 and second antenna coil 16 are so located that they overlap each other when viewed from the direction in which the two interconnection substrates 12 and 13 overlap. In other words, the first antenna coil 15, the number of turns of which is smaller, overlaps part of the second antenna coil 16, the number of turns of which is larger.

Since the two antenna coils (15, 16) are thus stacked so that their centers coincide and they overlap each other, as the contactless IC card 10 comes close to the reader/writer, the magnetic field of the reader/writer will influence the two antenna coils (15, 16) evenly and stabilize the voltages induced in the antenna coils (15, 16).

If the surface of the external sheet 14 is to be embossed with numbers or characters, the area to be embossed should be an area other than the areas in which the antenna coils (15, 16) lie. In this embodiment, since the antenna coils (15, 16) are located and stacked as mentioned above, a sufficient area is available inside them for embossing.

Figure 6:
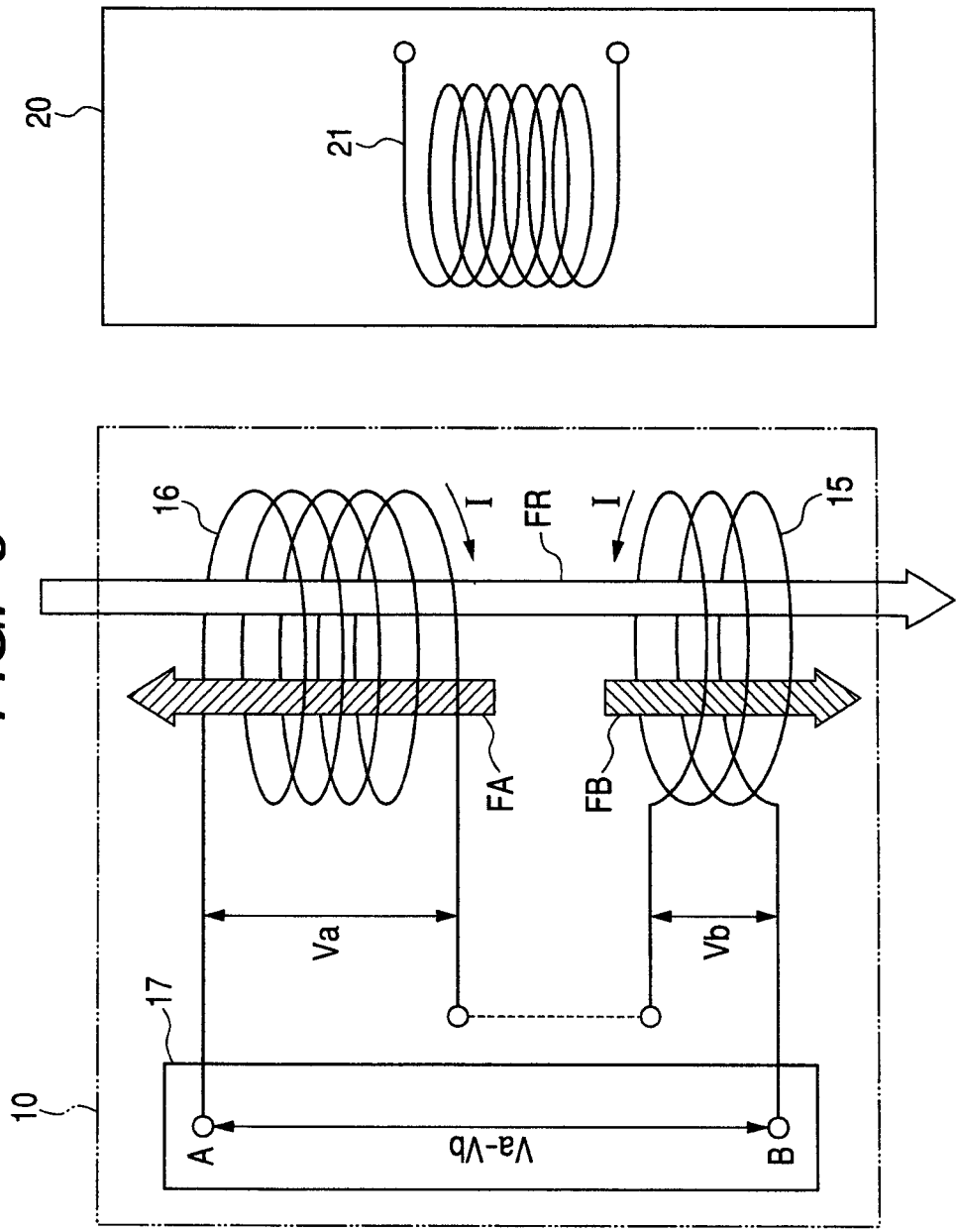
FIG. 6 illustrates how the IC card according to the embodiment works.

Next, how the contactless IC card 10 works will be explained referring to FIG. 6.

The reader/writer 20 for the contactless IC card 10 incorporates an antenna coil 21; as a current flows in the antenna coil 21, a magnetic field (FR) is generated around it. At this time, if the contactless IC card 10 comes close to the reader/writer 20, the magnetic field (FR) induces voltages (V (Va, Vb)) in the antenna coils (15, 16) of the contactless IC card 10 and electric current (I) flows therein. This current (I) is converted into DC electricity by the circuitry of the IC chip 17, which activates the IC chip 17. As the current (I) flows in the antenna coils (15, 16), magnetic fields (FA, FB) are generated in the antenna coils (15, 16), affecting the antenna coil 21 of the reader/writer 20. In this way, electric power is supplied from the reader/writer 20 to the contactless IC card 10 and signals are exchanged between the reader/writer 20 and the contactless IC card 10.

As explained above, in this embodiment, the winding directions of the two antenna coils (15, 16) of the contactless IC card 10 are opposite to each other. Therefore, when the contactless IC card 10 comes close to the reader/writer 20, if the voltage induced in the first antenna coil 15 is a negative voltage (−Vb), the voltage induced in the second antenna coil 16 is a positive voltage (+Va). Conversely, if the voltage induced in the first antenna coil 15 is a positive voltage (+Vb), the voltage induced in the second antenna coil 16 is a negative voltage (−Va). In other words, when the contactless IC card 10 comes close to the reader/writer 20, voltages opposite in polarity are induced in the two antenna coils (15, 16) simultaneously. Therefore, the voltage applied between two terminals (A, B) of the IC chip 17 is expressed by |Va|−|Vb|.

In addition, as explained above, the two antenna coils (15, 16) of the contactless IC card 10 are different in terms of the number of turns and the number of turns of the first antenna coil 15 is smaller than that of the second antenna coil 16. Therefore, the absolute value of the voltage (|Va|) induced in the second antenna coil 16, the number of turns of which is larger, is always larger than the absolute value of the voltage (|Vb|) induced in the first antenna coil 15.

This means that when the contactless IC card 10 comes close to the reader/writer 20, the voltage applied between the two terminals (A, B) of the IC chip 17 is always smaller than the voltage induced in the second antenna coil 16, the number of turns of which is larger.

Consequently, even if the distance between the contactless IC card 10 and the reader/writer 20 is too short and the voltage induced in the second antenna coil 16 is excessively large, a voltage which is counterbalanced by the opposite-polarity voltage induced in the first antenna coil 15 is applied to the IC chip 17 so breakdown of the circuitry of the IC chip 17 or deterioration in reliability is prevented.

When the distance between the contactless IC card 10 and reader/writer 20 is longer and the voltage induced in the second antenna coil 16 is decreased, the opposite-polarity voltage induced in the first antenna coil 15 is also decreased. Consequently, the influence of the first antenna coil 15 on the voltage applied to the IC chip 17 is smaller and as far as the distance between the contactless IC card 10 and the reader/writer 20 is within a prescribed range, supply of electric power and reception/transmission of data are performed reliably.

One example of a method for manufacturing the contactless IC card 10 as mentioned above is as follows: first, an interconnection substrate 13 is laid over an interconnection substrate 12 with a first antenna coil 15 formed thereon and the substrates are joined, then a second antenna coil 16 is formed on the surface of the interconnection substrate 13. In this process, part of the second antenna coil 16 is formed on the interconnection substrate 12 in a way that one end thereof extends to an area of the interconnection substrate 12 in which an IC chip is to be mounted.

Next, an IC chip 17 is mounted over the interconnection substrate 12 and the IC chip 17 and the first antenna coil 15 are electrically coupled through a projecting electrode 18a and the IC chip 17 and the second antenna coil 16 are electrically coupled through a projecting electrode 18b.

Next, the IC chip 17 is covered by sealing resin 19 and a hot press process is carried out with the interconnection substrates 12 and 13 sandwiched between two external sheets 11 and 14 so that the interconnection substrates 12 and 13 and the external sheets 11 and 14 are thermally welded and united to complete a contactless IC card 10.

Second Embodiment

Unlike the first embodiment, the second embodiment uses two kinds of conductive materials with different electric resistances as the materials for the first antenna coil 15 and second antenna coil 16.

For example, one of the antenna coils (15, 16) may be made of aluminum (specific resistance=$2.75 \times 10^{-8}$ Ωm) and the other may be made of copper (specific resistance=$1.72 \times 10^{-8}$ Ωm) or tungsten (W) (specific resistance=$5.5 \times 10^{-8}$ Ωm). If that is the case, even if the two antenna coils (15, 16) are equal in terms of the number of turns, the voltages electromagnetically induced in them are different unlike the first embodiment, which means that it is possible to increase the difference between the voltages induced in the two antenna coils (15, 16) or make a fine adjustment.

It is also possible that the two antenna coils (15, 16) are different in terms of the number of turns like the first embodiment.

The invention made by the present inventors has been so far explained in reference to the preferred embodiments. However, the invention is not limited thereto but may be modified in various ways without departing from the spirit and scope of the invention.

In the above embodiments, the first antenna coil 15 and second antenna coil 16 are so located that their centers virtually coincide with each other when viewed from the direction in which the two interconnection substrates 12 and 13 overlap. However, even if their centers are somewhat out of alignment, it poses no problem. Furthermore, in the above embodiments, the first antenna coil 15 and second antenna coil 16 are so located as to overlap with each other when viewed from the direction in which the two interconnection substrates 12 and 13 overlap. However, it is allowed that they are staggered from each other.

The above embodiments have been explained on the assumption that the invention is applied to a contactless IC card. However, the invention is not limited thereto, and it may be applied to mobile terminals such as mobile phones which use wireless IC chips.

The present invention can be applied to contactless IC cards which transmit and receive signals and supply electric power by electromagnetic induction.

What is claimed is:

1. A contactless IC card which transmits and receives signals and supplies electric power by electromagnetic induction, the card comprising:
    a first antenna coil with one end electrically coupled to a first terminal of an IC chip, the coil having a first number of turns and a first winding direction;
    a second antenna coil with one end electrically coupled to a second terminal of the IC chip, the coil having a second number of turns, different from the first number of turns, and a second winding direction opposite to the first winding direction;
    a first interconnection substrate on which the first antenna coil is formed; and
    a second interconnection substrate on which the second antenna coil is formed,
    wherein one of the first antenna coil and the second antenna coil lies over the other,
    wherein the IC chip is mounted over either the first interconnection substrate or the second interconnection substrate,
    wherein the first antenna coil is formed along a periphery of a surface of the first interconnection substrate and the second antenna coil is formed along a periphery of a surface of the second interconnection substrate, and
    wherein the first and second interconnection substrates are stacked one upon the other between a pair of external sheets and an area which is on a surface of the external sheets and inside the areas of the first and second antenna coils is embossed with a given stamp.

2. The IC card according to claim 1, wherein the first antenna coil and the second antenna coil are stacked with their centers coinciding with each other.

3. The IC card according to claim 1, wherein the IC chip is located inside the first and second antenna coils and off a center of a card body.

4. The IC card according to claim 1, wherein specific resistance of a conductor making up the first antenna coil and specific resistance of a conductor making up the second antenna coil are different from each other.

5. A contactless IC card which transmits and receives signals and supplies electric power by electromagnetic induction, the card comprising:
    a first antenna coil with one end electrically coupled to a first terminal of an IC chip, the coil having a first number of turns and a first winding direction;
    a second antenna coil with one end electrically coupled to a second terminal of the IC chip, the coil having a second number of turns and a second winding direction opposite to the first winding direction;
    a first interconnection substrate on which the first antenna coil is formed; and
    a second interconnection substrate on which the second antenna coil is formed,
    wherein one of the first antenna coil and the second antenna coil lies over the other, and
    wherein specific resistance of a conductor making up the first antenna coil and specific resistance of a conductor making up the second antenna coil are different from each other,
    wherein the IC chip is mounted over either the first interconnection substrate or the second interconnection substrate,
    wherein the first antenna coil is formed along a periphery of a surface of the first interconnection substrate and the second antenna coil is formed along a periphery of a surface of the second interconnection substrate, and
    wherein the first and second interconnection substrates are stacked one upon the other between a pair of external sheets and an area which is on a surface of the external sheets and inside the areas of the first and second antenna coils is embossed with a given stamp.

6. The IC card according to claim 5, wherein the first number of turns is the same as the second number of turns.

7. The IC card according to claim 5, wherein the first antenna coil and the second antenna coil are stacked with their centers coinciding with each other.

8. The IC card according to claim 5, wherein the IC chip is located inside the first and second antenna coils and off a center of a card body.

* * * * *